(No Model.)

H. H. HOLTKAMP.
ATTACHMENT FOR BICYCLES.

No. 390,368. Patented Oct. 2, 1888.

WITNESSES:
W. R. Davis
C. Sedgwick

INVENTOR:
H. H. Holtkamp
BY Munn & Co.
ATTORNEYS.

UNITED STATES PATENT OFFICE.

HERMAN HENRY HOLTKAMP, OF NEW KNOXVILLE, OHIO.

ATTACHMENT FOR BICYCLES.

SPECIFICATION forming part of Letters Patent No. 390,368, dated October 2, 1888.

Application filed January 11, 1888. Serial No. 260,381. (No model.)

*To all whom it may concern:*

Be it known that I, HERMAN HENRY HOLTKAMP, of New Knoxville, in the county of Auglaize and State of Ohio, have invented a new and Improved Bicycle Attachment, of which the following is a full, clear, and exact description.

The object of this invention is to provide an exceedingly simple, cheap, and durable attachment for bicycles or tricycles, whereby such vehicles may be run upon ice or upon snowy ground; and to the end named the invention consists of a runner or shoe arranged for connection with the small wheel of the vehicle, and of bearing-plates which may be clamped to the peripheral face of the large or driving wheel.

Reference is to be had to the accompanying drawings, forming a part of this specification, in which similar figures of reference indicate corresponding parts in all the views.

Figure 1:
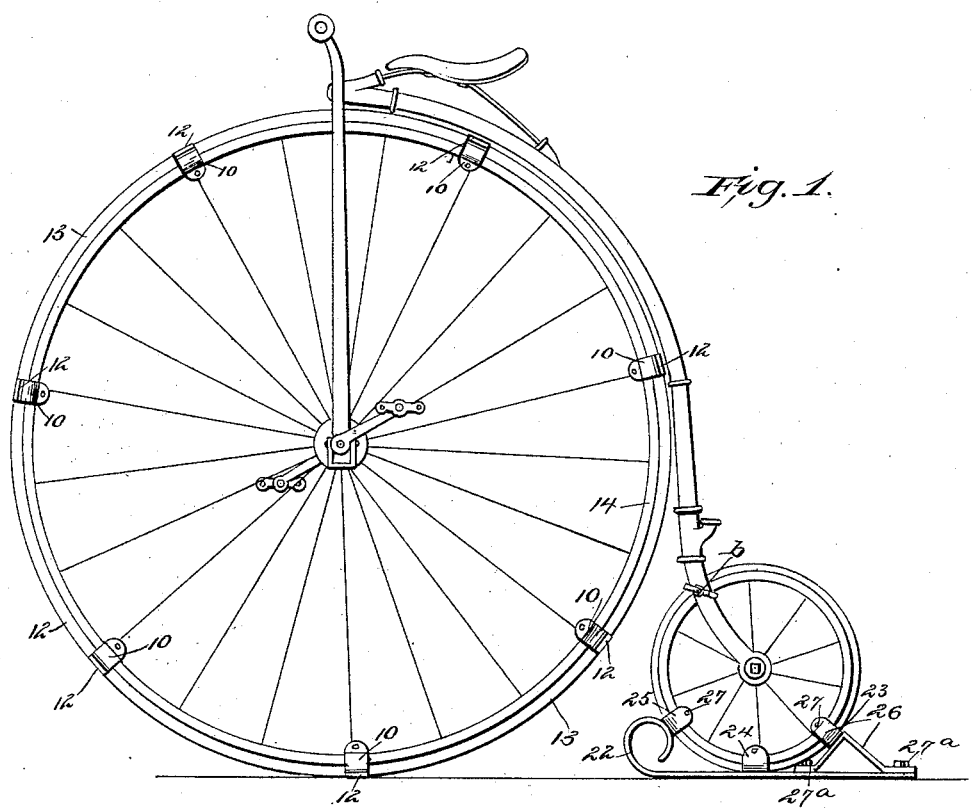
Figure 2:
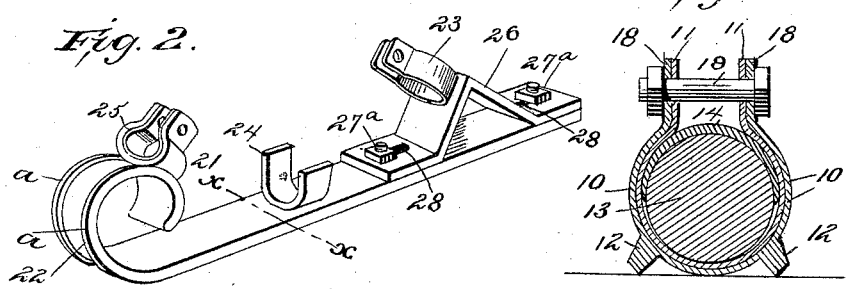
Figure 3:
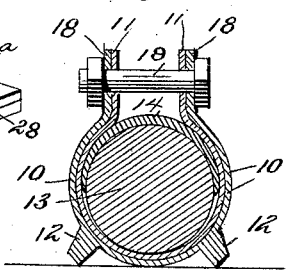
Figure 4:
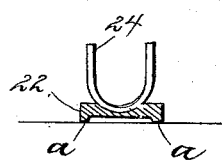

Figure 1 is a side view of a bicycle, representing the same as it appears when provided with my improved attachment. Fig. 2 is a perspective view of the shoe used in connection with the small wheel. Fig. 3 is an enlarged cross sectional view of one of the clamps employed in connection with the large driving-wheel, and Fig. 4 is a cross sectional view of the runner on line *x x* of Fig. 2.

In the drawings above referred to, 10 represents a cylindrical metallic plate lined with leather or other soft slightly-yielding material, 11, and formed with flanges 12, which extend outward from the side of the cylindrical section. This section is arranged so that it may be passed over the rubber tire 13 and the felly 14 of the large wheel of the bicycle, beyond which felly there are two projections, 18, which extend toward the hub of the wheel and are apertured to receive a clamping-bolt, 19, by which the attachment is clamped to the wheel. As many of these attachments as may be necessary are secured in position, as shown in Fig. 1—that is, the clamps are placed in front of the spokes.

To the smaller wheel of the bicycle there is secured a runner, 22, which has a rear clip, 23, a central stay-clip, 24, and a forward clip, 21, which said clips are passed about the felly and the tire of the rear wheel and clamped to place by bolts 27, as shown. The runner 22 is formed with side flanges, *a*, as shown best in Fig. 2.

In order that the runner may be used in connection with wheels of different diameters, I secure the clip 23 to a bracket, 26, which is adjustably connected to the main body of the runner by bolts 27$^a$, said bolts passing through slots 28, that are formed in the bracket. By placing the flanges 12 at either side of the center of the tire I provide for the operation of the ordinary form of bicycle-brake. It will of course be understood that the small wheel is lashed to the backbone of the bicycle, as represented at *b*.

With such an attachment as the one above described the rider may use the vehicle upon ice or upon heavily-packed or frozen snow, the arrangement being such that the attachments may be connected to or removed from the bicycle in an exceedingly short space of time.

Having thus fully described my invention, I claim as new and desire to secure by Letters Patent—

1. As a new article of manufacture, a cylindrical body formed with side flanges, 12, and upwardly-extending projections that are apertured to receive a clamping-nut, said cylindrical body being provided with a soft inner lining, substantially as described.

2. A bicycle attachment consisting of clips for the driving-wheel, having outwardly-projecting flanges, and a runner for the small wheel, having a central clip and a clip at each side of and projecting toward the central clip, the rear clip being adjustably secured to the runner, substantially as described.

3. The combination, with a bicycle, of flanged clamps arranged for connection with the driving-wheel thereof, and a runner provided with clamps, the rear one of which is adjustable, said runner being arranged in connection with the small wheel of the bicycle, substantially as described.

HERMAN HENRY HOLTKAMP.

Witnesses:
CHARLES FRITSCH,
LOUIS HELMSTETTER.